Sept. 8, 1964
L. C. MORTON
3,147,763
SEALING MEANS
Filed Feb. 16, 1961
2 Sheets-Sheet 1
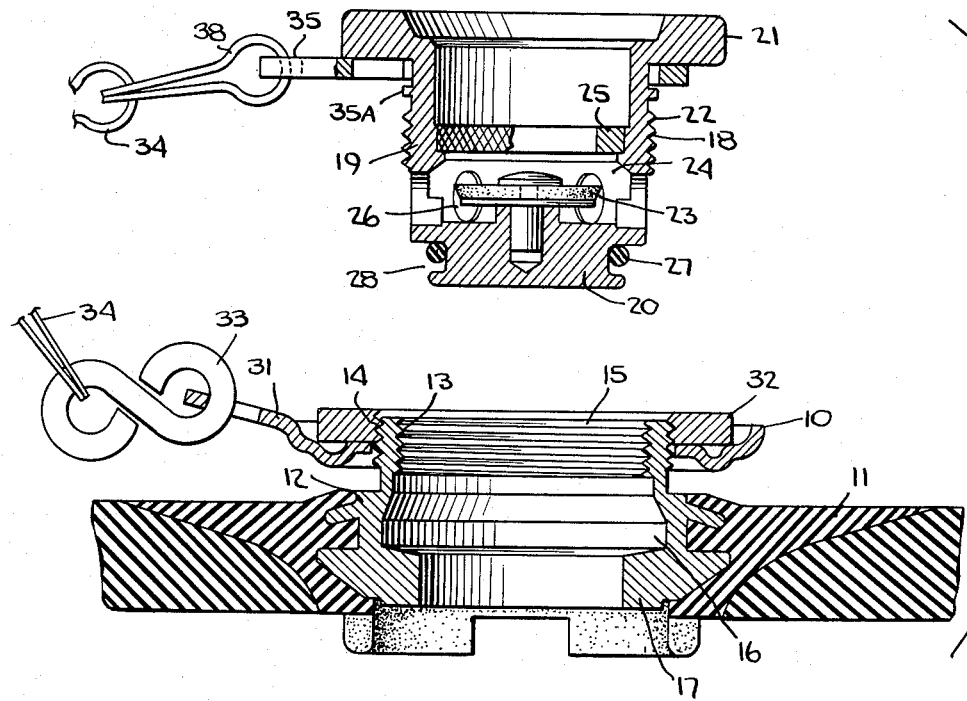
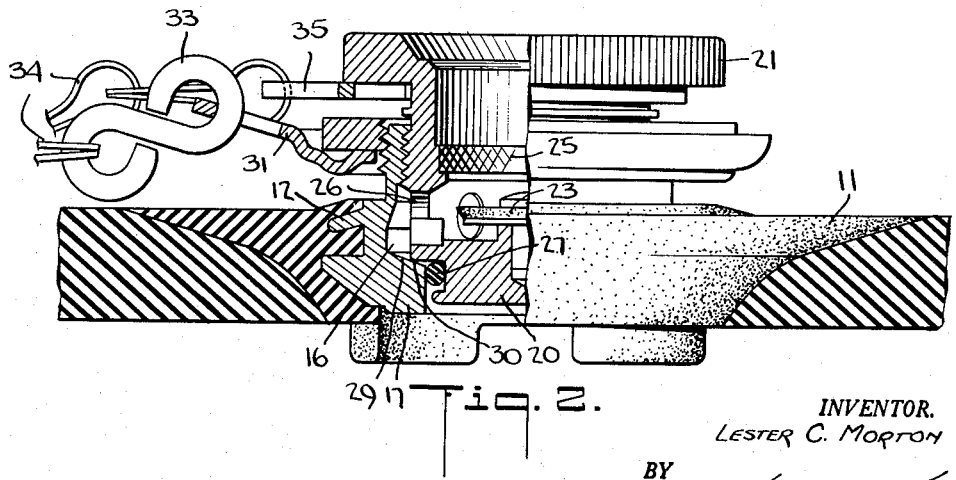
Fig. 1.
Fig. 2.
INVENTOR.
LESTER C. MORTON
BY
*Kenyon & Kenyon*
ATTORNEYS Sept. 8, 1964 L. C. MORTON 3,147,763
SEALING MEANS
Filed Feb. 16, 1961 2 Sheets-Sheet 2
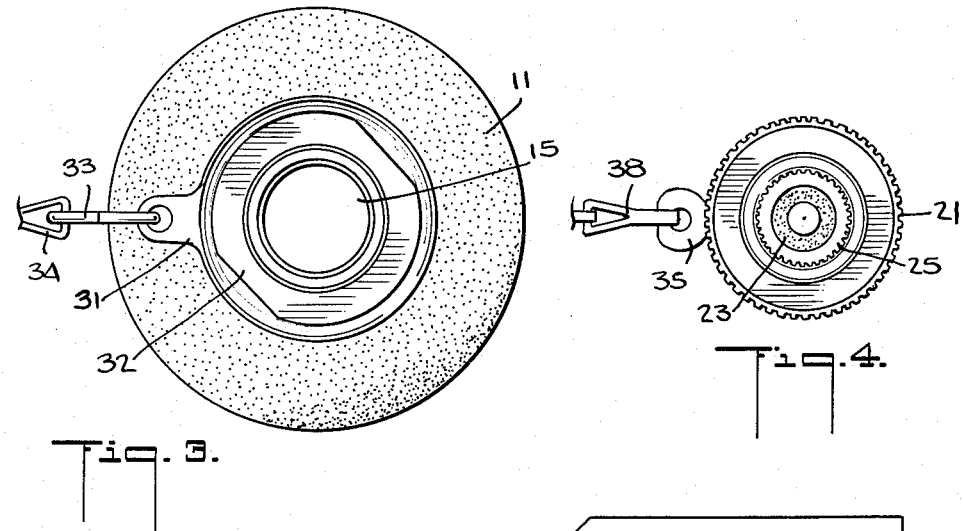
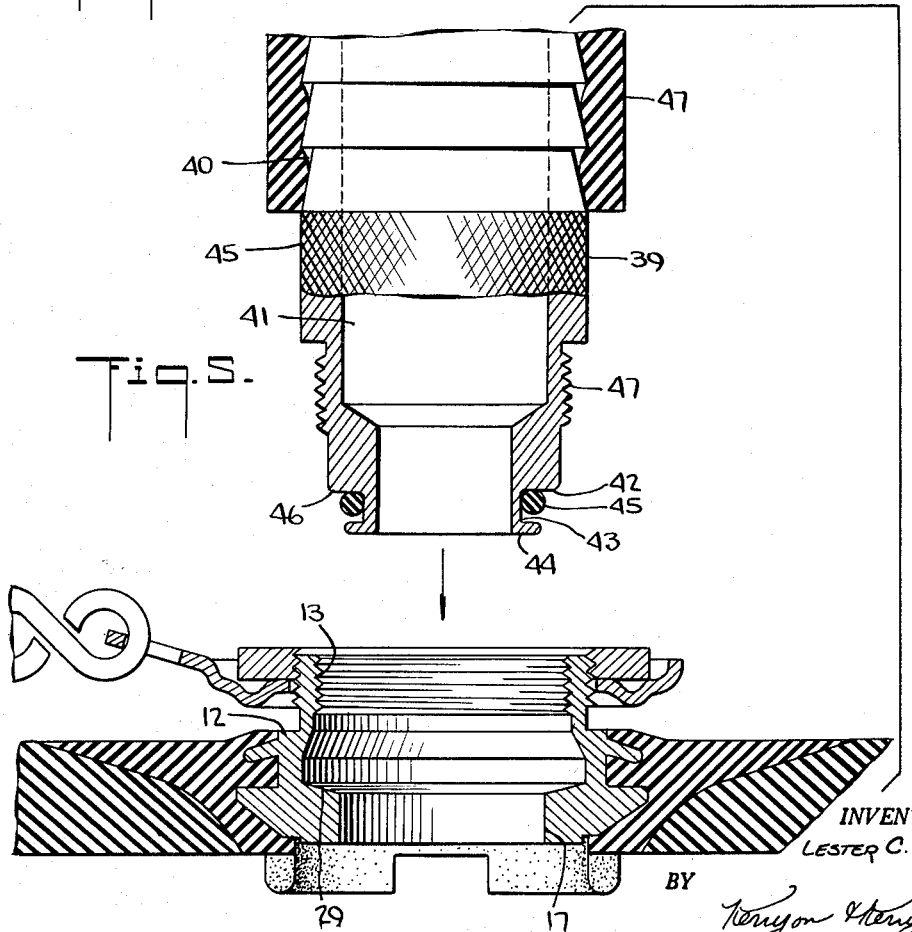
INVENTOR.
LESTER C. MORTON
BY
Kenyon & Kenyon
ATTORNEYS

United States Patent Office 3,147,763
Patented Sept. 8, 1964

3,147,763
SEALING MEANS
Lester C. Morton, Trumbull, Conn., assignor to National Distillers and Chemical Corporation, a corporation of Virginia
Filed Feb. 16, 1961, Ser. No. 89,751
3 Claims. (Cl. 137—234.5)

This invention relates to means for inflating and sealing dunnage air mattresses or the like.

Dunnage mattress valves, hose connectors and other devices of the prior art containing a sealing means for retaining air, usually employ conventional rubber washers of a cylindrical configuration. These washers effect a heal on their top and bottom surfaces. The tightness of the seal of prior art valves employing these washers depends upon how tightly one screws in the cap. The greater the contained air pressure, the tighter the cap must be, and the more difficult it is for the operator to insure that he has a proper air-tight seal.

Forces created during compression of the cylindrical rubber gaskets of the prior art, oppose the tightening process by the operator and over a period of time even act to loosen the valve or connector cap. Forces resulting from the compression set of the gasket, vibration and thermal expansion and contraction, cause the cap to unscrew slightly, with air leakage as the eventual result.

It is the object of this invention to provide an improved dunnage valve which will effect a fluid-tight seal with ease and reliability.

It is the further object of this invention to provide an improved dunnage mattress valve which will remain sealed and secure over long periods of time and under adverse environmental conditions, including extremes in temperature, and vibrational or compressive forces.

It is a further object of this invention to provide improved hose connectors and like items used for the conduction or carrying of fluids, which items will be fluid-tight for long periods of time and under adverse environmental conditions.

It is a still further object of this invention to provide facile and reliable sealing means as an integral part of, and in combination with dunnage mattress valves, hose connectors and other devices used with appropriate articles for the storage or conduction of air, the sealing means being effective over a long period of time and under adverse environmental conditions.

Other objects and further features of this invention will become apparent from the following specification and the accompanying drawings, wherein FIG. 1 is a side view in section of a dunnage mattress valve embodying the invention with the cap and housing disassembled;

FIG. 2 is a side view of the dunnage mattress housing assembly of FIG. 1 partly in section and with the cap in place in the housing;

FIG. 3 is a top view of the dunnage mattress valve housing in which is incorporated the improvement of this invention;

FIG. 4 is a top view of the dunnage mattress valve cap of FIG. 2, and

FIG. 5 is a side view and partial section of the dunnage mattress valve housing and a hose connection therefor in disassembled relationship.

Briefly, the primary embodiment of the combination of this invention comprises a dunnage mattress housing and a dunnage valve cap. The dunnage housing has a bore which terminates in a cylindrical seat at its inner end. Adjacent this seat is situated a chamber portion, of a diameter larger than the passage defined by the cylindrical seat, which opens to the inner end of the housing.

The dunnage valve cap is essentially a hollow cap having a bore which terminates in a closed inner end portion, the diameter of which permits this inner end portion to fit loosely in the passage defined by the cylindrical seat of the housing when the cap and housing are assembled. Adjacent the closed inner end portion of the cap, there is an annular recess on the outer surface to receive an O-ring which fits in the cylindrical seat of the housing. The valve cap and housing have screw threads for mutual interengagement for adjusting the position of the cap relative to the housing. The valve cap is also provided with at least one lateral port connecting the chamber of the housing with the bore of the valve cap outwardly from the closed inner end of said bore when cap and housing are assembled. A check valve is mounted in the passage of the valve cap outwardly from the lateral port and prevents outflow of air through the ports of the cap when the O-ring is not sealing the passage between the cylindrical seat of the housing and the cylindrical portion of the cap.

Another embodiment of this invention rests in the combination of hose connector and dunnage mattress housing. The threads provided on the hose connector interengage with threads of the housing when the two are assembled. The hose connector is provided with a cylindrical portion and an O-ring in an annular recess on the outer surface thereof adjacent its inner end. The said inner end of the connector is an open cylindrical portion designed to fit loosely within the passage defined by the cylindrical seat of the dunnage housing. A seal is effected by the O-ring between the connector and the cylindrical seat of the housing.

Referring to FIGS. 1 and 2 the dunnage mattress housing assembly is depicted and referred to generally by the numeral 10. Said assembly comprises a rubberized insert 11 designed to fit into standard openings, made for that purpose in dunnage mattresses. Contained within the rubberized insert 11, is the machined, hollow-bore dunnage housing 12, threaded interiorly at 13 and exteriorly at 14. This casing 12 is made of brass or like metal.

The housing 12 has a bore or passage 15 including an enlarged chamber portion 16 and a cylindrical seat 17. The cylindrical seat 17 leads from chamber 16 to the interior of the dunnage mattress.

The dunnage valve cap 18 comprises a hollow body portion 19 and a cylindrical terminal portion 20 which closes the end of said hollow body portion 19 which has a knurled knob portion 21 and is threaded exteriorly at 22. The diameter of said body portion and the threads are such as to provide a snug interengaging screw fit of the body 19 in the threads 13 of the dunnage housing 12 when the two are assembled as shown in FIG. 2.

A check valve 23 is situated in a cylindrically formed bore 24 of the said body portion 19 and is made of a hard rubber or a like material. A retaining ring 25 is located as shown in FIG. 1, within the bore 25 of said body portion. It holds the valve 23 in place and serves as a valve seat therefor. The valve is disposed to check flow outwardly through the cap while permitting inward flow.

Several lateral apertures or ports 26 are formed in the body portion 19 of said valve cap 18, providing outlets connecting the bore 24 with the chamber 16. They are located between the check valve 23, its seat 25, and the closed inner end 20 of the cap.

An O-ring washer 27, made of a material such as rubber, plastic, leather or some other suitably pliant material, is fitted in an annular recess 28 on the outer surface of the closed cylindrical terminal portion 20 in the body portion 19. The inner diameter of said O-ring washer 27 is approximately equal to the outer diameter of the recess 28, providing a snug fit therein and its outer diameter is such that it fits snugly in the cylindrical seat 17.

In use, the mattress assembly 10 is sealed in an aperture in a dunnage mattress. The cap 18 is screwed into the dunnage casing 12, a short distance. Air is pumped into the mattress past check valve 23, through the ports 26, through the chamber 16 and cylindrical seat or passage 17 and into the mattress. When pumping is stopped the internal air pressure of the mattress actuates the check valve 23, which provides a temporary seal by impinging against the retaining ring 25, effecting a seal thereon.

The cap 18 is then screwed into the dunnage housing 12 as far as it will go to provide a more permanent seal. The O-ring washer 27 fits into the bore or cylindrical seat 17 and effects a seal on its inner and outer diameters, between the cylindrical seat 17 and the cap 18.

The device of this invention will effect an air-tight seal regardless of the position of the cap so long as the O-ring is in the cylindrical seat 17.

Since the O-ring washer 27 is not compressed between the cap and seat as is the case with prior art compression washers there is no bias which might tend to loosen the cap. When the cap of this invention is screwed into place so that the O-ring washer 33 is in the cylindrical seat 17, the O-ring resists any tendency of the cap to unscrew even if the cap is not seated. When the cap is screwed in tightly it seats metal-to-metal with a force strong enough to overcome any bias which might be present in the O-ring due to the turning movement. Since the parts are preferably all of the same metal, namely, brass, thermal expansion or contraction will provide no tendency toward loosening the cap. The improvement of this invention thus provides dunnage valves which will remain air-tight for very long periods of time and under conditions of extreme temperature, pressure and vibrative forces. Moreover, the design of the improvement of this invention permits easy and reliable sealing with a minimum of manual effort. With the cap 18 completely tightened in the housing 12, the operator feels that the valve is tight, since there is a metal-to-metal contact of the seat 29 with the abutting shoulder 30 of the cap 18 which precludes further tightening and indicates a complete seal.

A large link washer 31 may be placed on the housing 12 below the exterior threads 14 and retained in place by a lock nut 32, which is threaded on said exterior threads 14.

In the embodiment pictured in FIG. 1, a link 33 and chain 34 are connected between the secured link washer 31 and the dunnage valve cap 18. This chain 34 ties the valve cap 18 to the housing 12 and prevents an operator's misplacing the said dunnage valve cap. Other equivalent tying means may be used.

A link washer 35 is secured on said cap, preferably in juxtaposition with the knurled knob portion 21 of the valve cap 18 and is attached to chain 38, securing said cap 18 to said housing 12. The cap 18 is free to rotate in the link washer 35.

The link washer 35 is positioned above the swivel shoulder 35a and because of this arrangement the link washer 35 will not catch upon the threads when one is unscrewing or loosening the cap.

A side view of a hose connector 39 is shown in FIG. 5. A corrugated exterior surface 40 is designed to permit the insertion of said connector into a conventional hose. The combination of hose connector 39 and housing 12 represents another embodiment of this invention. These two major components co-act, resulting in a novel device heretofore unavailable.

The hose connector 39 has a bore 41, a cylindrical end 42, having an annular recess 43 adjacent its open terminal end 44 and an O-ring washer 45 fitted in said recess 43. The diameter of said terminal 44 is less than the diameter of the body portion 46 of said connector.

The body portion 46 is threaded exteriorly at 47.

Threads 47 are of a diameter sufficient to provide an interengaging fit between said hose connector 39 and the threads 13 of housing 12 of the dunnage mattress housing assembly 10, depicted in FIG. 1. A knurled gripping surface 45 is provided on said connector 39, as shown.

In operation, the hose connector 40 is screwed into the dunnage housing 12. The exterior threads 47 of said connector 40 and the interior threads 13 of said housing 12, interengage as indicated above. A seal is effected by the O-ring washer 45, between the wall of the annular recess 43 and the wall of the cylindrical seat 17 of the housing 12. The terminal portion 44 fits loosely into said passage 23. When the hose connector 40 is advanced as far as it will go into said housing 12, the abutting shoulder 46 of the connector 39, abuts the top surface 29 of the cylindrical seat 17 of the housing 12, indicating to the operator that a complete seal has been effected. A conventional hose 47 is placed on the hose connector 39 by advancing said hose over the corrugated exterior surface 40 of said connector 39.

The hose connector 40, thus described possesses the same advantages as the valve cap 19 described above. A complete and secure seal is effected when the O-ring 45 is fitted in cylindrical seat 17 and clearly at approximately one turn from its fully seated position. This seal will remain intact for long periods of time and under adverse conditions of vibration, and thermal expansion and contraction.

The present invention may be embodied in other specific forms not described herein, without departing from the spirit and essential attributes thereof. It is, therefore, desired that the present embodiments be considered in all respects illustrative and not restrictive, reference being had to the appended claims rather than to the foregoing description to indicate the scope of the invention.

Having thus described my invention, I claim:

1. A filling and sealing device comprising a housing having a bore terminating at its inner end in a cylindrical seat, said housing having a chamber portion adjacent said seat, a hollow plug disposed in said bore having a closed inner end and a cylindrical portion fitting loosely in the cylindrical seat of said housing, and a passage in said plug leading to its outer end, said hollow plug and said housing having interengaging screw threads to secure them in adjustable assembled relation, said hollow plug having an annular recess situated on the surface of its cylindrical portion, and an O-ring seal fitting in said annular recess adapted to fit in and seal the space between said plug and said cylindrical seat of said housing, said hollow plug having at least one lateral port disposed outwardly with respect to said O-ring and communicating with said passage in said plug and disposed generally opposite said chamber portion when said housing and plug are assembled, and a check valve in said passage in said plug to check outflow, disposed outwardly from said lateral port.

2. A dunnage mattress valve comprising a housing having a bore terminating at its inner end in a cylindrical seat, said housing having a chamber portion adjacent said seat, said seat defining a passage leading to said inner end of said housing, and a valve cap having a closed inner end and a cylindrical portion fitting loosely within the passage defined by the cylindrical seat of said housing, said valve cap having a bore opening to its outer end, said valve cap of said housing having inter-engaging screw threads to secure them in adjustable assembled relation, said valve cap having an annular recess situated on the outer surface of its cylindrical portion, and an O-ring seal fitting in said annular recess adapted to fit in and to seal the space between said valve cap and said cylindrical seat of said housing, said valve cap having at least one lateral port disposed outwardly with respect to said O-ring and communicating with said bore of said valve cap, and disposed generally opposite said chamber portion when said housing and plug are assembled, and a check valve disposed outwardly from said ports in said bore to check outflow.

3. A dunnage mattress valve comprising a housing having a hollow bore, a dunnage valve cap and an O-ring seal, said housing comprising an interior chamber and a cylindrical seat at the base of said chamber, said seat defining a passage leading to the inner end of said housing, said valve cap comprising an annular knob portion, a hollow body portion, a closed cylindrical terminal portion, and a check valve situated within the bore of said hollow body portion and disposed to prevent the outward flow of air, said body portion being laterally ported between said closed cylindrical terminal portion and said check valve, and adapted to open into the chamber portion of said housing, said O-ring seal adapted to fit into the annular recess of said body portion of said valve cap, said housing and said valve cap having interengaging screw threads to secure them in adjustable assembled relation, said O-ring seal being adapted to seal the passage between said valve cap and said cylindrical seat of said housing.

References Cited in the file of this patent
UNITED STATES PATENTS

| | | |
|---|---|---|
| 767,098 | Belden | Aug. 9, 1904 |
| 909,061 | Chew | Jan. 5, 1909 |
| 1,478,584 | Schweinert | Dec. 25, 1923 |
| 1,918,443 | Baash | July 18, 1933 |
| 2,524,052 | Grant | Oct. 3, 1950 |
| 2,914,344 | Anthes | Nov. 24, 1959 |